Feb. 15, 1927.

W. C. GEER 1,617,707

LAMINATED MATERIAL AND METHOD OF MAKING THE SAME

Filed June 25, 1925

Inventor
William C. Geer
By Pierson, Eakin & Avery
Attys.

Patented Feb. 15, 1927.

1,617,707

UNITED STATES PATENT OFFICE.

WILLIAM C. GEER, OF AKRON, OHIO, ASSIGNOR TO THE B. F. GOODRICH COMPANY, OF NEW YORK, N. Y., A CORPORATION OF NEW YORK.

LAMINATED MATERIAL AND METHOD OF MAKING THE SAME.

Application filed June 25, 1925. Serial No. 39,519.

This invention relates to laminated sheet material and has for an object to provide a laminated structure having a vulcanized rubber facing and an adhesive backing, integrally united therewith and capable of forming a firm bond to metals, rubber, glass, wood, etc. A further object is to provide a method for producing these laminated structures.

The inherent characteristics of vulcanized rubber, such as its imperviousness to water, its relative inactivity with respect to acids, its flexibility and elasticity, its resistance to abrasion and wear, etc., are such as to make it a desirable superficial layer or veneer on a wide variety of articles. Thus, its well known properties adapt it for such uses as a label to be applied to battery jars, metal containers, etc., as a lining for spouts and receptacles, or as a covering for stair treads, floors, etc. However, there have been heretofore no practical means available for securing the firm and durable union of the rubber veneer to materials of the character herein mentioned which is essential to the successful industrial application of rubber in these and similar fields.

In the present invention, I employ the heat-plastic rubber isomer, described in my prior application Serial No. 8,057, filed January 6, 1925, or other heat-plastics having similar properties, as the intermediary layer or binder for effecting the union of the rubber layer to the surface of an article to which it is desired to secure the rubber. I have found that, while the ordinary methods of application of the heat-plastic adhesives of my former application are satisfactory for most uses, it is desirable in many instances to have the rubber and the heat-plastic preformed into a composite body ready for application to other articles as the needs require. Thus, a laminated structure is preferably preformed with a vulcanized rubber facing and a backing of the heat-plastic integrally coalesced therewith by the same process that vulcanizes the rubber facing. This preformed sheet can be stored away, and, when required, can be stuck to metal, or other surfaces, by first wetting the backing with a solvent, such as gasoline, and then pressing it on. Better results can be normally obtained by giving to the metal, or other surface to which the rubber is to be applied, a coating of a cement made from the heat plastic, permitting the cement to dry and then pressing on the laminated sheet. The latter should be held in surface contact with the article being treated until the cement sets, and it is desirable to leave the pressure on for a considerable period. Where cement is not used, it is preferable to heat the laminated structure to a temperature of 220-240° F. and apply hot. Superior results may sometimes be obtained by warming the surface to which the laminated structure is to be applied, but this is not essential.

In practice, I find that the following heat-plastics have proven to be especially practical and commercially satisfactory as a backing for my laminated sheet construction. They are herein given for the purpose of illustration, it being understood that other heat-plastics of the same fundamental character, especially those of my prior application Serial No. 8,057, are within the scope of my invention: (1) The tough, non-grindable, balata-like rubber isomer formed by the reaction of an intimate mixture of 7¼ parts by weight of p-phenol sulfonic acid and 100 parts of rubber, when heated in a compact mass from 4 to 10 hours at 250-290° F. or, reaction products in which the phenol sulfonic acid is replaced by any of the following: sulfuric acid, 4 to 5 parts; p-toluene sulfonyl chloride, 9 parts; p-phenol sulfonic acid 5 parts and sulfuric acid, 2 parts; or other acids or acid mixtures of the character herein indicated, approximately 7 parts. (2) A similar heat-plastic product formed by the reaction of 4 to 5 parts by weight of concentrated sulfuric acid (sp. gr. 1.84) intimately mixed with 100 parts of rubber and 2 to 50 parts of pine tar when heated in a compact mass from 5 to 7 hours at 268° F.

The above products have been found upon analysis to contain mainly hydrocarbons having the same carbon and hydrogen ratio as rubber, and further to be chemically less unsaturated than rubber. They are, therefore, heat-plastic isomers of rubber. They have a higher specific gravity than rubber, being of the order of 0.970 to 1.005. These materials are employed for the purposes of the present application in their impure state, except for the washing in water to remove any excess acid, and may even be oxidized slightly from exposure to the atmosphere. I also prefer in some instances to admix with these hydrocarbon reaction products an organic flux such as mineral rubber, paracumerone wax, tung oil, etc., and an organic preservative such as benzidine, aldol-alphanaphthylamine, etc. The following recipe is illustrative:

| | |
|---|---|
| Heat plastic | 86 |
| Aldol a-naphthylamine | 3 |
| Benzidine | 1 |
| Tung oil | 10 |

The term "heat-plastic" as used in this specification is intended to include either the purified or impure products above described whether admixed with preservative and flux or not and other reaction products of similar character however derived, namely, materials the main constituent of which consists of a tacky, heat-plastic product having the same carbon and hydrogen ratio as rubber and a less chemical unsaturation than rubber.

In the preparation of the laminated structure, laminæ of curable rubber composition and of the heat-plastic are superimposed one on the other and the rubber vulcanized in contact with the heat-plastic, preferably in a platen press. In this process there is a tendency for the vulcanizing reagents to migrate from the rubber composition to the heat-plastic. A limited migration is desirable since it firmly unites or vulcanizes the two laminæ together. However, where the lamina of rubber is relatively thin, 1/32 inch or less, migration may become so excessive as to rob the rubber of the vulcanizing agents, producing an undercuring of the rubber in part or in whole. I have found that a fluxing or melting of the heat-plastic is conducive to migration of vulcanizing agents, and that objectionable migration of vulcanizing agents from thin rubber sheets to the heat-plastic can be inhibited by controlling the fluidity of the heat-plastic. When the lamina of rubber is relatively thick, 1/16 inch or more, the rubber and heat-plastic may be cured together at regular curing time and temperature of the rubber composition. In any case, the heat-plastic being extremely adhesive to metals when hot, provision needs be made to eliminate in a large measure sticking of the heat-plastic to the platens of the press. This may be minimized by controlling the fluidity of the heat-plastic, and prevented by the use of certain materials, such as the so-called dusting powders, inserted between the press platen and the heat-plastic during cure. When the heat-plastic is permitted to melt during cure, it generally emerges from the cure with small pits and bubbles therein. These are likewise eliminated by controlling the fluidity of the heat-plastic during cure.

Of the accompanying drawing—

Figure 1:
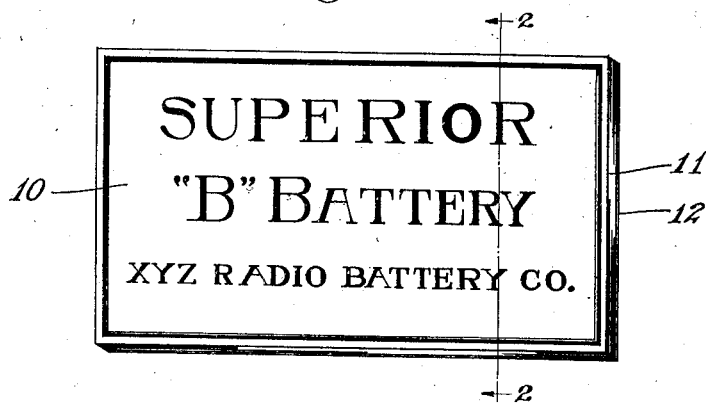
Fig. 1 is a perspective view showing a rubber veneer sheet.
Figure 2:
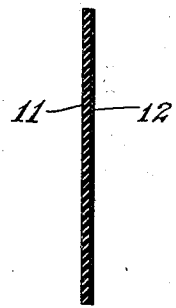
Fig. 2 is a sectional view on line 2—2 of Fig. 1.

By way of example, the drawing illustrates a rubber veneer sheet 10 of general application, and here illustrated as a water and acid impervious label for battery jars having a facing 11 of calendered curable rubber stock of standard composition, 1/64 inch thickness or less, and a similarly calendered backing 12 of the heat-plastic reaction product of rubber and phenol sulfonic acid above described. The exposed surface of the facing 11 may, as shown, have imprinted thereon any suitable matter. The following facing stock has given satisfactory results: rubber, 100 parts by weight; sulfur, 2.7 parts; zinc oxide, 4 parts; mineral rubber, 5 parts; diphenyl guanidine, 1 part. This stock regularly cures in 35 minutes at 280° F. Onto one side of the calendered rubber sheet 11 the thin sheet 12 of the heat-plastic (1/64 inch thick or less) is rolled to form a laminated or plied-up sheet construction, as by passing the sheets between rollers to press them together smoothly. It is also possible to calender the heat-plastic directly onto the rubber. In the curing operation, a zinc plate is placed over one platen of a regular platen press, coated with a disappearing dusting powder, and the heat-plastic side of the composite sheet placed thereon. A zinc or a tin plate is employed for the reason that of the common metals heat-plastics of the character herein described have been found to adhere less at moderate temperatures to zinc and tin than they do to iron or steel. The press is closed and the platen contiguous the rubber layer is heated to a temperature required for the vulcanization of the particular rubber composition used. During cure of the rubber, the heat-plastic layer is maintained at such temperature that it does not flux or liquefy at least until after the rubber composition has set or the cure advanced to a stage where the sulfur is not free to migrate, and preferably throughout the period of cure.

Control of the fluidity of the heat-plastic during vulcanization may be had in a number of ways. It has been found that a pad of fabric between the zinc plate and the press platen, the latter not being heated, can be made to equalize the pressure and to hold the temperature and fluidity of the heat-plastic within proper limits. Or, the platen contiguous to the zinc plate and heat-plastic layer may be maintained at 212° F., as by running steam at atmospheric pressure therethrough. This temperature is sufficiently low to prevent objectional migration of sulfur to the heat-plastic layer. In either of the cases hereinabove noted, an essential is that the heat-plastic shall not soften sufficiently during the cure of the rubber composition to absorb readily the sulfur content of the contiguous rubber layer, or to liquefy to such extent as to pit on cooling.

Alternatively to the above process, where very thin sheets of rubber, or the order of 1/128 inch, are to be combined with a heat-plastic backing, I may employ special low temperature curing rubber compositions in which the vulcanizing agents will have acted in the rubber stock at a lower temperature than that at which they freely migrate to the heat-plastic. The following stock is suitable for this purpose:

| | |
|---|---|
| Rubber | 100 |
| Thiourea (from orthotoluidine) | 3.5 |
| Diphenyl guanidine | 1 |
| Sulfur | 4 |
| Stearic acid | 2 |
| Active zinc oxide | 10 |

The above stock may be calendered into a sheet, superposed on a sheet of the heat-plastice, and cured in a platen press for 15 minutes at 240° F., both platens being heated, and a dusted zinc plate being interposed between the heat-plastic and the press platen as in the previous example.

I have found that where the rubber layer is relatively thick, more than 1/32 inch, that the rubber can be cured contiguous to a thin back of heat-plastic at the regular curing time and temperature of the rubber stock, provided precautions are taken to prevent adhesion of the heat-plastic to the press platen during cure. In this, as well as in the previous cases hereinabove set forth, a great advantage has been found to exist in the use between the zinc plate and the heat-plastic of a special dusting powder, which has the property of being absorbed in the heat-plastic slowly during cure. Stearic acid is well adapted for this purpose and zinc stearate and aluminum stearate, zinc benzoate, zinc resinate, zinc palmitate and other substances having similar properties may be employed. The use of these powders does not materially lessen the adhesive property of the heat-plastic backing, and its adhesiveness can be completely restored by wetting with gasoline, benzene or other rubber solvent.

As an alternative for the use of the above described disappearing dusting powders, I may admix with the heat-plastic relatively large amounts of certain pigments which render the heat-plastic backing non-adhesive with respect to zinc during the vulcanization of the rubber facing. An admixture of 20 to 30 parts of lithopone to 100 parts of heat-plastic has been found to work very well.

I have described with considerable detail certain embodiments of my invention chosen for the purpose of illustration in order that the process and product thereof may be abundantly clear. It will be understood that the particular constructinos described are merely exemplary and that they may be varied somewhat widely without departing from the invention as defined by the appended claims.

I claim:

1. The method of making a laminated sheet which comprises superposing a sheet of curable rubber composition upon a sheet of heat-plastic material, and vulcanizing the two in pressure contact.

2. The method of making a laminated sheet which comprises superposing a sheet of curable rubber composition upon a sheet of heat-plastic material, and vulcanizing the two in pressure contact, the temperature of the heat-plastic being maintained below its fluxing point.

3. The method of making a laminated sheet which comprises superposing a sheet of curable rubber composition upon a sheet of heat-plastic material, and vulcanizing the two in pressure contact, the temperature of the heat-plastic being maintained not materially in excess of 212° F.

4. The method of making a laminated sheet which comprises superposing a sheet of curable rubber composition and a sheet of heat-plastic material, and vulcanizing the assembled sheet between heated platens.

5. The method of making a laminated sheet which comprises superposing a sheet of curable rubber composition and a sheet of heat-plastic material, and vulcanizing the assembled sheet between heated platens, a sheet of zinc being interposed between a platen and the heat-plastic sheet.

6. The method of making a laminated sheet which comprises superposing a sheet of curable rubber composition and a sheet of heat-plastic material, and vulcanizing the assembled sheet between heated platens, a powder absorbable in the heat plastic at temperatures of vulcanization being interposed between a platen and the heat-plastic sheet.

7. The method of making a laminated sheet which comprises superposing a sheet of curable rubber composition and a sheet of heat-plastic material, and vulcanizing the assembled sheet between heated platens, a film of zinc stearate being interposed between a platen and the heat-plastic sheet.

8. The method of making a laminated sheet which comprises plying up a sheet of curable rubber composition and a sheet consisting mainly of a tacky, heat-plastic rubber isomer, subjecting the assembled sheets to heat sufficient to vulcanize the rubber composition and to coalesce the two sheets firmly together.

9. The method of making a laminated sheet which comprises plying up a sheet of curable rubber composition and a sheet consisting mainly of a tacky, heat-plastic rubber isomer, subjecting the assembled sheets to heat between platens, the platen contiguous to the heat-plastic being maintained at a temperature lower than the fluxing point thereof.

10. The method of making a laminated sheet which comprises plying up a sheet of curable rubber composition and a sheet consisting mainly of a tacky, heat-plastic rubber isomer, subjecting the assembled sheets to heat between platens, the platen contiguous to the heat-plastic being maintained at a temperature not materially in excess of 212° F.

11. The method of making a laminated sheet which comprises plying up a sheet of curable rubber composition and a sheet consisting mainly of a tacky heat-plastic rubber isomer, subjecting the assembled sheets to heat sufficient to vulcanize the rubber composition, the heat-plastic sheet having admixed therein sufficient stiffening pigment to prevent it fluxing at the temperature of vulcanization.

12. The method of making a laminated sheet which comprises plying up a sheet of curable rubber composition containing quick-curing, vulcanizing agents, and a sheet of tacky, heat-plastic material, and subjecting the assembled sheet to heat sufficient to vulcanize the rubber composition and to coalesce firmly the cured rubber sheet to the heat-plastic sheet.

13. A laminated sheet material comprising a water insoluble heat-plastic back and a vulcanized rubber face, the two being integrally coalesced by vulcanization.

14. A laminated sheet material having a backing composed mainly of a tacky heat-plastic rubber isomer, and a facing of vulcanized rubber.

15. A laminated sheet material having a backing composed mainly of a tacky heat-plastic rubber isomer, and a facing of vulcanized rubber, the two being vulcanized together.

16. A laminated sheet material comprising a vulcanized rubber face and a heat-plastic back coalesced thereto by vulcanization.

17. A laminated sheet material comprising a sheet of vulcanized rubber having integrally united thereto a backing composed of a tacky, heat-plastic derivative of rubber.

18. A laminated sheet material consisting of a lamina of vulcanized rubber unitarily united with a lamina of the reaction product of rubber with a sulfonic acid.

19. A laminated sheet material consisting of a lamina of vulcanized rubber firmly coalesced to lamina comprising a tacky, heat-plastic derivative of rubber having a specific gravity of the order of 0.980 to 1.005.

20. A laminated sheet material consisting of a lamina of vulcanized rubber and a lamina containing in substantial part a hydrocarbon composed of carbon and hydrogen in the same ratio as in rubber but having a less chemical unsaturation than rubber.

In witness whereof I have hereunto set my hand this 11th day of June, 1925.

WILLIAM C. GEER.